July 3, 1962  F. W. ROHE  3,042,156
EXPANDIBLE SPACER
Filed May 6, 1957
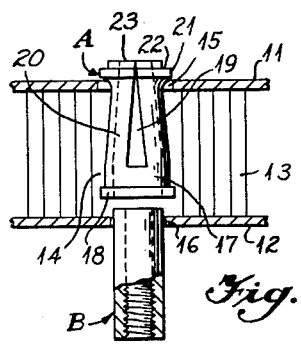
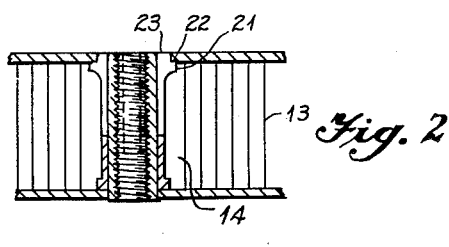
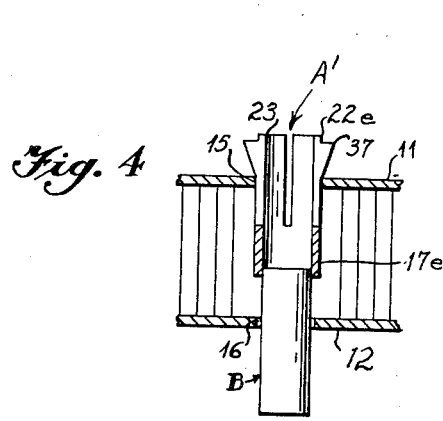
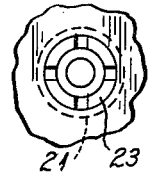
INVENTOR
FREDERICK W. ROHE
BY Lynn H Latta
ATTORNEY

United States Patent Office 3,042,156
Patented July 3, 1962

3,042,156
EXPANDIBLE SPACER
Frederick W. Rohe, 879 S. East St., Anaheim, Calif.
Filed May 6, 1957, Ser. No. 657,371
10 Claims. (Cl. 189—34)

This invention relates to lightweight panels of the type utilized in aircraft for the wall structure thereof, wherein a pair of spaced parallel metal skin sheets are joined by a low density core structure of honeycomb construction, and relates particularly to the problem of attaching such panels to the frame of the airplane or other structure and the problem of attaching other parts to the panel. It is now established practice to utilize, for this purpose, grommets or bushings, inserted and anchored within the panel structure and providing either a cylindrical bore or a threaded bore for the reception of a bolt or a screw as the case may be. Such devices are commonly called inserts or spacers, and the general object of the present invention is to provide such a device, hereinafter referred to as a spacer, having improved features of construction and installation.

A particular object of the invention is to provide a spacer having means for securely anchoring both ends thereof into respective openings in the respective skin sheets of a honeycomb panel, and which, when installed, is adapted to provide a reinforced opening extending all the way through the panel, open at both ends, for reception of a bolt or other securing element which may be required to pass entirely through the panel. More particularly, the invention contemplates a spacer having means at each end thereof adapted to interlock with a piloting action in connection with openings in the respective skin sheets of a honeycomb panel.

A further object is to provide an improved honeycomb panel spacer adapted to be freely inserted through the opening of one skin sheet of a honeycomb panel in an initial stage of installation procedure, and later to be expanded at one end in order to establish secure anchoring engagement with such skin sheet.

Other objects and advantages will become apparent in the ensuing specification and appended drawings in which:

FIG. 1 is a sectional view through a honeycombed panel showing an early stage of installation of a spacer embodying one form of my invention;

FIG. 2 is a sectional view through the panel and spacer of FIG. 1, with the spacer in fully assembled position;

FIG. 3 is an end view of the spacer of FIG. 2 showing a fragmentary plan view of the panel; and FIG. 4 is a sectional view illustrating the insertion of a spacer embodying a still further modified form of the invention.

Referring now to the drawings in detail, I have shown in FIGS. 1, 2 and 3 thereof, as an example of one form in which my invention may be embodied, a honeycomb panel embodying spaced parallel skin sheets 11 and 12 of lightweight sheet metal (e.g. aluminum) and a connecting core 13 of honeycomb construction, defining a plurality of cells extending transversely between the sheets 11 and 12 and fabricated from extremely lightweight sheet metal strip material, the edges of which are bonded or welded to the skin sheets 11 and 12 in accordance with known construction. At spaced intervals in the honeycomb panel are spacer-receiving holes 14, bored or otherwise formed in the core structure, and communicating with circular openings 15 and 16 in the respective skin sheets 11 and 12. The opening 15 is of somewhat larger diameter than the opening 16.

My improved spacer, in this form of the invention, is in two parts, including a jacket A and a liner sleeve B.

Sleeve B may be internally threaded, as shown, or may be a plain bushing. The jacket A has at one end a circumferentially continuous, cylindrical skirt portion 17 at the end of which is a radially outwardly extending flange 18. The remainder of the jacket A is furcated, having a series of diametrically disposed slots 19 by which the jacket is circumferentially divided into a series of segments 20 (e.g. four quarter segments as shown in FIG. 3). At the ends of the segments 20 are flange segments 21 projecting radially and collectively defining an annular radial shoulder 22 from which a corresponding series of neck segments 23 project axially to collectively define a piloting neck.

The opening 15 is slightly larger in diameter than the flange 18 so that the latter may be freely passed through the opening 15. The segmental flange 21 is likewise initially of slightly smaller diameter than the opening 15 so as to freely pass therethrough as the jacket A is inserted into the panel as shown in FIG. 1. However, after passing through the opening 15, the segmental flange 21 is adapted to be expanded to a diameter larger than the opening 15 so as to interlock against the inner face of the skin sheet 11 in the assembled position of FIG. 2. Accordingly, the furcated portion of the jacket A is initially contracted to a smaller diameter than its ultimate diameter in the assembled structure, and correspondingly, the segments 20 converge toward one another at the split end of the jacket, in frusto conical array as shown in FIG. 1.

The liner sleeve B has an external diameter just slightly smaller than the diameter of the bore in the skirt portion 17 of the jacket A, and just slightly smaller than the diameter of opening 16, which may be approximately the same as the bored diameter of skirt 17. In the operation of assembling the spacer, the jacket A is inserted through the larger opening 15 and the liner B is inserted through the smaller opening 16 and thence into the bore of skirt 17, whereupon it may function as a guide to locate the skirt 17 and flange 18 in concentrical relation to opening 16, the jacket A being moved inwardly until flange 18 rests against the inner face of skin sheet 12. The jacket A is then held in this position by any suitable bucking tool applied to its split end, and the sleeve B is then driven through the jacket A, engaging the converging inner faces of segments 20 and expanding the segments until the advancing end of the sleeve B reaches a position flush with the ends of neck segments 23, whereupon the jacket A will have been fully expanded to force the neck segments 23 tightly against the wall of opening 15 and to seat the shoulder 22 against the inner face of skin sheets 11. The opposite end of liner B will then project beyond the flange 18 a distance corresponding to the thickness of skin sheet 12 to provide a pilot in opening 16 at that end of the spacer. The liner sleeve B will be frictionally gripped by the jacket A and thus held in assembly. The spacer is now securely anchored in the panel, with the segmental neck 23 piloted in the opening 15, the opposite end of sleeve B piloted in the opening 16, and the flange 18 and shoulders 22 seated against the respective inner faces of the skin sheets 12 and 11 respectively.

The Invention as Disclosed in FIG. 4

FIG. 4 discloses a further modification of the invention wherein the spacer A', in unstressed condition, has its furcated end composed of segments 37, of larger diameter than the opening 15, the segments 37 being of wedge shape, with external faces converging axially toward the skirt section 17e of minimum diameter, whereby the spacer can be forced through the opening 15 and the segments 37 will yield radially inwardly to pass through the opening, and will then spread outwardly so that their shoulders 22e will engage against the inner face of skin sheet 11, the neck segments 23 engaging in the opening 15 and yieldingly pressing against the wall of the opening to maintain a tight fit. A sleeve B may be inserted, as in FIG. 1, to constitute a liner for the spacer, and will be held in assembly by frictional engagement within jacket A with its one end piloted in opening 16, as in FIG. 2. The spacer jacket A' is of a length such that, when inserted through the opening 15 and its shoulders 22e in engagement with the inner surface of skin sheet 11, the end of the skirt section 17e will abut the inner surface of skin sheet 12, as in the form of the invention disclosed in FIG. 1.

I claim:

1. In combination with a lightweight panel structure including spaced parallel skin sheets and a low density core bridging between and joining said sheets and having therein a hole normal to said skin sheets, said panel having circular openings in respective skin sheets communicating with the respective ends of said hole; and a spacer comprising a tubular jacket having at one end a circumferentially continuous skirt portion and at its other end a furcated portion, said furcated portion having a segmental axially projecting neck of a length substantially the same as the thickness of said one skin sheet and received in one of said openings, said furcated end portion further including an annular segmental substantially flat radial shoulder integral with said neck, extending radially outwardly from the base of said neck and including a plurality of flexible elongated segments having a substantially uniform wall thickness substantially reduced below the radial thickness of said jacket through said shoulder, joining said skirt portion to said annular shoulder whereby said shoulder may assume a contracted condition of sufficiently small diameter for passage of said shoulder through said one opening and reception of said segmental neck portion in said one opening during installation of the spacer; and a cylindrical liner sleeve received in and frictionally held by said jacket and supporting said segmental end portion in expanded condition with said segmental neck snugly engaged in said one opening and substantially flush with the outer surface of said skin sheet, with said shoulder bearing against the inner face of said one skin sheet, with the end of said skirt portion of the jacket in adjacent relation to the other skin sheet, and with the adjacent end of said liner sleeve projecting into the opening in said other skin sheet.

2. A spacer as defined in claim 1, wherein said furcated end portion is originally of a diameter smaller than said one opening, to freely pass therethrough during insertion, and being adapted to be expanded by insertion of said liner sleeve into the spacer, to effect the aforesaid engagement of said neck in said one opening and said shoulder against said one skin sheet.

3. In combination with a lightweight panel structure including spaced parallel skin sheets and a low density core bridging between and joining said sheets, said panel having a hole in said core extending transversely between said skin sheets and having circular openings in respective skin sheets, communicating with the respective ends of said hole, the opening of one of said skin sheets being larger than the opening of the other skin sheet; a spacer comprising a tubular jacket having a maximum diameter slightly smaller than said larger opening whereby it may be inserted therethrough into said panel hole, said jacket including an entering portion in the form of a circumferentially continuous skirt adapted to make abutting engagement against said other skin sheet around the smaller opening therein, and at its opposite end having a furcated expansible portion including a segmental axially projecting neck of a length substantially the same as the thickness of the one skin sheet and received in said larger opening, said furcated end portion further including an annular segmental substantially flat radial shoulder integral with said neck extending radially outwardly from the base of said neck and including a plurality of flexible elongated segments having a substantially uniform wall thickness substantially reduced below the radial thickness of said jacket through said shoulder, joining said skirt portion to said annular shoulder whereby said shoulder may assume a contracted condition of sufficiently small diameter for passage of said shoulder through said larger opening and reception of said segmental neck portion in said larger opening during installation of the spacer; and a cylindrical liner sleeve insertible through said smaller opening after said tubular body has been inserted in the panel, and adapted to be driven into the tubular body to expand said expansible end portion whereby said sleeve is received in and frictionally held by said jacket and supporting said segmental end portion in expanded condition with said segmental neck snugly engaged in said larger opening and substantially flush with the outer surface of said one skin sheet, with said shoulder bearing against the inner face of said one skin sheet, with the end of said skirt portion of the jacket in abutting relation to the other skin sheet, and with the adjacent end of said liner sleeve projecting into the opening in said other skin sheet to set the same into abutting engagement with the inner face of said one skin sheet around said larger opening.

4. A panel and spacer combination as defined in claim 1, wherein said furcated end portion of said jacket includes a series of wedge-shaped segments with frusto-conical external faces converging axially from said shoulder toward said skirt portion, and wherein said flexible segments comprise relatively thin spring finger portions joining said wedge-shaped segments to said skirt portion, normally yieldingly positioning said segments in spread-apart condition, and adapted to spring inwardly to accommodate passage of said shoulders through said one opening in response to camming action of said frusto-conical external faces against the margin of said one opening.

5. A panel and spacer combination as defined in claim 1, wherein said furcated end portion, in its unstressed state, is contracted to a diameter sufficiently small to pass said segmental shoulder portion thereof through the opening of said one skin sheet, and is adapted to thereafter be expanded by insertion of said liner sleeve therein, so as to establish seating engagement of said segmental shoulder against the inner face of said one skin sheet.

6. A panel and spacer combination as defined in claim 1, wherein said one opening is of larger diameter than the other opening, and wherein said other opening has a diameter just slightly larger than the external diameter of said liner sleeve so that the projecting end of the latter is received in said other opening with a piloting action.

7. The combination defined in claim 1, wherein said furcated end portion of said jacket has a maximum diameter normally larger than the diameter of the said one opening, wherein the segments of said furcated end portion are adapted to yield inwardly to accommodate the insertion of said jacket into said panel through said one opening, and wherein the end of said skirt portion of the jacket is abutted against said other skin sheet around its said opening when said annular radial shoulder is engaged against the inner face of said one skin sheet around said one opening.

8. A spacer as defined in claim 1, wherein said furcated end is normally of larger diameter than said larger opening, and the segments thereof have frusto conical external faces tapering inwardly from said shoulder toward the opposite end of the spacer, for a camming engagement with the wall of said larger opening to cause said segments to yield inwardly until the major diameter of said furcated end has passed through said larger opening.

9. A combination panel and spacer as defined in claim 1, wherein said sleeve is provided with a threaded bore for reception of a threaded fastener element.

10. A panel and spacer combination as defined in claim 3, wherein the end of said skirt portion of the jacket is provided with a radial flange for abutment against the inner face of said other skin sheet around said smaller opening when the segmental shoulder of the jacket is engaged against the inner face of said one skin sheet around said larger opening.

References Cited in the file of this patent

UNITED STATES PATENTS

| | | |
|---|---|---|
| 550,314 | Adams | Nov. 26, 1895 |
| 1,835,243 | Schaffert | Dec. 8, 1931 |
| 2,060,970 | Belden | Nov. 17, 1936 |
| 2,181,103 | Davis | Nov. 21, 1939 |
| 2,244,977 | Hansman et al. | June 10, 1941 |
| 2,448,413 | Borghesi | Aug. 31, 1948 |
| 2,559,759 | De Swart | July 10, 1951 |
| 2,585,557 | Kreimendahl | Feb. 12, 1952 |

FOREIGN PATENTS

| | | |
|---|---|---|
| 564,712 | Great Britain | Oct. 10, 1944 |